Nov. 4, 1947.  L. N. STRIKE  2,430,195
ROTARY BUCK PAD
Filed Sept. 4, 1944
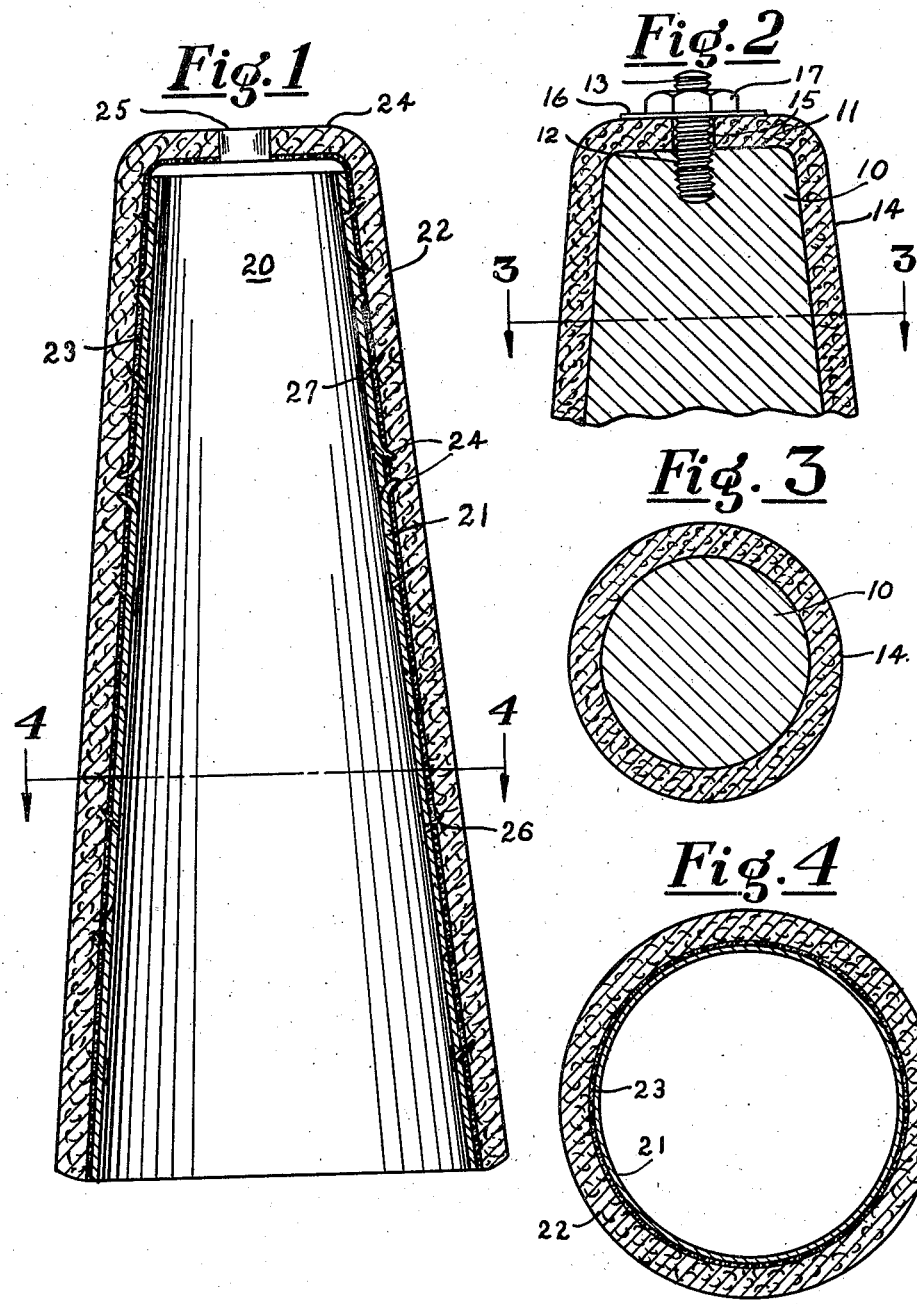
INVENTOR.
LOUIS N. STRIKE
BY Carlos G. Stratton
ATTORNEY Patented Nov. 4, 1947

2,430,195

UNITED STATES PATENT OFFICE 2,430,195

ROTARY BUCK PAD

Louis N. Strike, Salt Lake City, Utah

Application September 4, 1944, Serial No. 552,617

4 Claims. (Cl. 38—65)

This invention relates to ironing machines and more especially to a resilient covering element for a rotary bucking member of such machines.

An object of the invention is to provide a simple, novel and improved form of a resilient pad for a rotary bucking member of an iron machine.

Another object of the invention is to provide a covering pad for a rotary bucking member adapted to be readily attached thereto and easily removed therefrom.

A further object is to provide a detachable pad for a rotary bucking element, and novel means for firmly securing the pad to the bucking member.

Still other objects of my invention include providing such means that are positive in operation, convenient in use, economical of manufacture, relatively simple, and of general superiority and serviceability.

The invention also comprises novel details of construction and novel combinations and arrangements of parts, which will more fully appear in the course of the following description. However, the drawing merely shows and the following description merely describes embodiments of the present invention, which is given by way of illustrating or example only.

In the drawings, like reference characters designate similar parts in the several views.

Fig. 1 is a view in central section, showing a pad and securing means for the same, according to my invention.

Fig. 2 is a fragmentary view in section showing the end portion of a rotary bucking member and a modified form of pad attachment thereto.

Fig. 3 is a sectional view taken along the line 3—3 of Fig. 2 and

Fig. 4 is a sectional view taken along the line 4—4 of Fig. 1.

Referring more in detail to the drawing I show a rotary bucking bar 10 which is conical or frustoconical in shape or tapered, as shown, having a flat free end 11 provided with a threaded aperture 12 in which may be secured a screw 13. It will be understood that bucking member 10 is preferably made of metal, such as cast aluminum or cast iron, or may be made of any other equivalent and suitable metal.

I show a pad 14, which is preferably of felt or other fabric or equivalent material, which is somewhat resilient or deformable and which may, if preferred, be covered by a textile sheet of muslin, linen or the like. Pad 14 is conical or tapered to conform to the outline of bucking member 10, and is provided with an aperture 15 through which screw 13 may extend for securing to the bucking member. I further show a washer 16 held by a lock nut 17 on screw 13, which, when tightened, firmly clamps the end of pad 14 to the end 11 of bucking member 10. As shown it will be apparent that pad 14 may be readily secured to member 10 and removed therefrom by tightening or loosening nut 17.

In Figs. 1 and 4 I show a modified form of securing means for a pad and in these figures there is disclosed a hollow metal cone 20 having a relatively thin wall portion 21 which is adapted to fit on and over a bucking member, such as member 10 of Figs. 2 and 3. Pad 22, substantially similar to pad 14, is secured to the outer surface of cone 20, and for a form of securing means I provide a layer of adhesive material 23 applied to the outer surface of cone 20 whereby pad 22 may be suitably secured thereto.

Pad 22 may be pre-formed and secured to cone 20 as a unit, or an adhesive coating 23 may be first applied to the cone and the felt material sprayed or blown thereon by an air stream in any conventional manner. Pad 22 will be formed with an overlapping end portion 24 and an aperture 25 provided therein for attachment by screw 13 and nut 17, after the manner of the form shown in Fig. 2.

As an optional means of securing pad 22 to cone 20, I show wall 21 punched out to form a plurality of prongs 24, at intervals, which prongs will engage the inner surface of pad 22 and prevent removal thereof from cone 20.

As shown, prongs 24 are punched or pressed out from wall portion 21, however, I show a further optional feature which may comprise a plurality of pointed tacks or rivet elements 26 which extend through wall 21 and have retaining heads 27 on the inside of wall 21.

The various forms of attachment for the felt sleeve are to be considered equivalent and optional, and any one or more or all may be employed if desired.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In an ironing machine having a rotary tapered free end bucking member, a cone pad structure for securing on and over said bucking member, said structure including a sleeve member having a closed end and a pad covering said sleeve and the closed end portion thereof.

2. In an ironing machine having a rotary tapered free end bucking member, a cone pad structure for securing on and over said bucking member, said structure including a sleeve member having a closed end and a pad covering said sleeve and said closed end and adhesively secured thereto.

3. In an ironing machine having a rotary tapered free end bucking member, a cone pad structure for securing on and over said bucking member, said structure including a tapered sleeve member having a closed end and a pad covering said sleeve and said end portion thereof, said pad and closed sleeve end having an aperture in the end thereof and means extending through said aperture and engaging said bucking member for securing said pad structure thereto and said sleeve having circumferential prongs for penetrating said pad to hold it against movement on said sleeve.

4. In an ironing machine having a rotary tapered, free end bucking member, a cone pad structure for said member, said structure including a tapered sleeve adapted to fit over said bucking member and having a closed end for enclosing and abutting the free end of said bucking member, said sleeve having a plurality of prongs longitudinally and circumferentially arranged, and a pad covering said sleeve and the closed end thereof and adapted to be held in position on said sleeve by said prongs, and means to secure said sleeve on the buck.

LOUIS N. STRIKE.

REFERENCES CITED

The following references are of record in the file of this patent:

UNITED STATES PATENTS

| Number | Name | Date |
|---|---|---|
| 1,059,778 | Solomon | Apr. 22, 1913 |
| 1,980,845 | Beattie | Nov. 13, 1934 |
| 2,115,941 | Castricone | May 3, 1938 |
| 2,143,724 | Wardwell | Jan. 10, 1939 |
| 2,253,949 | Castricone | Aug. 26, 1941 |
| 2,315,690 | Davis | Apr. 6, 1943 |
| 2,362,105 | Steinberg | Nov. 7, 1944 |